United States Patent [19]

Enomoto et al.

[11] Patent Number: 5,148,501
[45] Date of Patent: Sep. 15, 1992

[54] SCALAR DATA PROCESSING METHOD AND APPARATUS

[75] Inventors: Hajime Enomoto, Funabashi; Isao Miyamura, Niigata, both of Japan

[73] Assignee: Fujitsu Limited, Japan

[21] Appl. No.: 666,712

[22] Filed: Mar. 8, 1991

[30] Foreign Application Priority Data

Mar. 16, 1990 [JP] Japan .................. 2-066149

[51] Int. Cl.⁵ ............................................. G06K 9/36
[52] U.S. Cl. ........................................ 382/56; 382/22
[58] Field of Search .................. 382/8, 21, 22, 56; 358/12, 13, 432

[56] References Cited

U.S. PATENT DOCUMENTS

| | | | |
|---|---|---|---|
| 4,648,120 | 3/1987 | Chittineni | 382/22 |
| 4,849,914 | 7/1989 | Medioni et al. | 382/8 |
| 4,908,698 | 3/1990 | Enomoto et al. | 358/13 |
| 4,908,872 | 3/1990 | Toriu et al. | 382/22 |
| 4,910,786 | 3/1990 | Eichel | 382/22 |
| 5,014,134 | 5/1991 | Lawton et al. | 358/432 |

Primary Examiner—Jose Couso
Attorney, Agent, or Firm—Stass & Halsey

[57] ABSTRACT

A scalar data processing method and apparatus for compressing scalar data defined on a two-dimensional surface and for reconstructing the two-dimensional scalar data based on the compressed data. Edge lines of the scalar data are detected, a domain is obtained on a horizontal line intersecting with the edge lines and between the edge lines, and a function is determined as an approximation of a Laplacian of the two-dimensional scalar data at each point in the cut domain. The two-dimensional scalar data is compressed by replacing the two-dimensional scalar data at every point with scalar data at the edge lines, scalar data for providing gradients of the two-dimensional scalar data on the edge lines, and the function determined above. The two-dimensional scalar data by interpolating the two-dimensional scalar data based on the scalar data is reconstructed at the edge lines, scalar data for providing gradients of the two-dimensional scalar data on the edge lines, and the above function.

16 Claims, 5 Drawing Sheets

Fig. 2A

$$\Delta \phi = f(i) \quad \text{---} \quad (A)$$

$$\Delta \phi_k(i,j) = \phi_k(i+1,j) + \phi_k(i,j+1)$$
$$+ \phi_k(i-1,j) + \phi_k(i,j-1) - 4\phi_k(i,j)$$
$$\text{---} (B)$$

Fig. 3B $$\Delta \phi = f(i) \quad \text{———} \quad (C)$$

$$\Delta \phi_k(i,j) = 2\phi_k(i,j) - 2\phi_k(i-1,j) + \phi_k(i-2,j)$$
$$- 2\phi_k(i,j-1) + \phi_k(i,j-2)$$
$$\text{———} \quad (D)$$

SCALAR DATA PROCESSING METHOD AND APPARATUS

BACKGROUND OF THE INVENTION

1. Field of the Invention

The present invention relates to a scalar data dimensional scalar data and reconstructing the compressed two-dimensional scalar data.

It is desired to efficiently transmit and reconstruct two-dimensional scalar data, which can be represented as $\phi(x,y)$ such as luminance data of a picture on a two-dimensional surface or concave-convex data of a relief formed on a wall surface, or to efficiently determine a two-dimensional function $\phi(x,y)$ of a curved surface of an object such as a car body when the outer shape of the object is to be determined.

2. Description of the related Art

Conventionally, to transmit and reconstruct two-dimensional scalar data, or to determine the two-dimensional function, data of each pixel on the picture surface or each point on the desired body is used. This, however, requires that a tremendus amount of data be processed.

Therefore, an objective has been to enable the reconstruction of two-dimensional scalar data with a small amount of data, smaller than the number of pixels or points on the picture surface.

Reference can be made to U.S. Pat. No. 4,908,698 issued on Mar. 13, 1990, corresponding to Japanese Patent Application Nos. 62-133690 and 63-39284, filed by the same assignee of the present inventors. These applications are directed to providing a color picture synthesis technique in which, in a color picture transmission, a chrominance component of a given picture is separated into a lamellar component and a vortex component for transmission, and a synthesis of the color picture in combination with a luminance component in the above given picture is effected. This technique can be utilized in the present invention.

In the above proposal, the chrominance component is expressed by a vector V, and when the Helmholtz theory is applied to the vector V, it is noted that the vector V can be expressed as:

$$V = grad\ L + rot(R \cdot K) \tag{1}$$

where L(x,y) is a scalar potential such as the luminance, and R·K is a vector potential having a direction expressed by a unit vector K in the direction of the Z axis.

The lamellar component is the first item, i.e., grad L, in the above expression (1), and the vortex component is the second item, i.e., rot(R·K), in the above expression (1). By detecting and transmitting an edge line of the chrominance component by detecting only divergence V and rotation V which exceed predetermined threshold values which are the values on the edge line of the chrominance component of the picture, the chrominance component of the color picture for very point can be reconstructed by interpolation.

The present invention was conceived from the above proposal with respect to the chrominance component.

SUMMARY OF THE INVENTION

The present invention has an object to enable a reduction in the amount of data in the transmission or storing of two-dimensional scalar data by compressing two-dimensional data by the boundary value on the edge lines and by applying an interpolation by the use of the compressed data.

As will be seen from the above proposal, in accordance with the Helmholtz theory, if a vector V does not have a vortex component, the vector V is expressed by only the lamellar component grad L. The gradient component of the two-dimensional scalar data $\phi$ such as luminance is a vector. Therefore, if the vector V can be expressed by a scalar potential grad $\phi$, the Helmholtz theory can be expressed as:

$$V = grad\ \phi = grad\ L \tag{2}$$

An edge line of the scalar data is determined as a place where the divergence and rotation of the vector are greatly changed. The divergence of the vector in the expression (2) is $$\begin{aligned} div\ V &= div\ (grad\ \phi) \\ &= \partial^2\phi/\partial x^2 + \partial^2\phi/\partial y^2 \\ &= \Delta\phi \end{aligned} \tag{3}$$

The rotation of the vector V in the expression (2) is $$\begin{aligned} rot\ V &= rot\ (grad\ \phi) \\ &= 0 \end{aligned} \tag{4}$$

As a result of the above expressions (3) and (4), to detect the edge line of scalar data, since the rotation of the gradient $\phi$ is always zero, the edge line of the scalar data $\phi$ can be determined by detecting only the divergence of the gradient $\phi$, i.e., the Laplacian $\Delta\phi$, which exceeds the predetermined threshold value. Since the rotation of the vector V is always zero, it is not necessary to consider the rotation of the vector V. The Laplacian $\Delta\phi$, the absolute value of which exceeds the predetermined threshold value can be detected by detecting the value $\phi$ and its gradient on the edge line. Once the value $\phi$ and its gradient on the edge line are given, the values $\phi$ at the other points can be estimated by interpolation because the values $\phi$ at the other points are changed loosely.

Based on the above-mentioned idea, there is provided, according to the present invention, a scalar data processing method and apparatus for compressing two-dimensional scalar data defined on a two-dimensional surface having a horizontal direction and a vertical direction and for reconstructing the two-dimensional scalar data based on the compressed data.

The method includes detecting edge lines of the two-dimensional scalar data. The edge lines are detected in such a way that the change of the value of the two-dimensional scalar data between adjacent points on the two-dimensional surface is larger than a predetermined threshold value. The method also includes cutting or a defining a domain along a horizontal line intersecting with the edge lines, and between the edge lines; determining a function as an approximation of a Laplacian of the two-dimensional scalar data at each point in the cut domain. The two-dimensional scalar data are compressed by replacing the two-dimensional scalar data at every point with scalar data at the edge lines, scalar data for providing gradients of the two-dimensional scalar data on the edge lines, and the function determined in the above. Finally the two-dimensional scalar data are reconstructed by interpolating the two-dimensional scalar data based on the scalar data at the edge lines, scalar data for providing gradients of the two-dimensional scalar data on the edge lines, and the function obtained in the above compressing step.

The scalar data processing apparatus according to the present invention includes an edge line detecting unit for detecting edge lines of the two-dimensional scalar data. A domain cutting unit is provided for cutting a domain on a horizontal line intersecting with the edge lines and between the edge lines. A function determining unit is provided for determining a function as an approximation of a Laplacian of the two-dimensional scalar data at each point in the domain. A compressing unit is provided for compressing the two-dimensional scalar data by replacing the two-dimensional scalar data at every point with scalar data at the edge lines, scalar data for providing gradients of the two-dimensional scalar data on the edge lines, and the function determined in the above compressing unit. Finally a reconstructing unit for reconstructing the two-dimensional scalar data by interpolating the two-dimensional scalar data based on the scalar data at the edge lines, scalar data for providing gradients of the two-dimensional scalar data on the edge lines, and the function.

DESCRIPTION OF THE PREFERRED EMBODIMENTS

Figure 1:
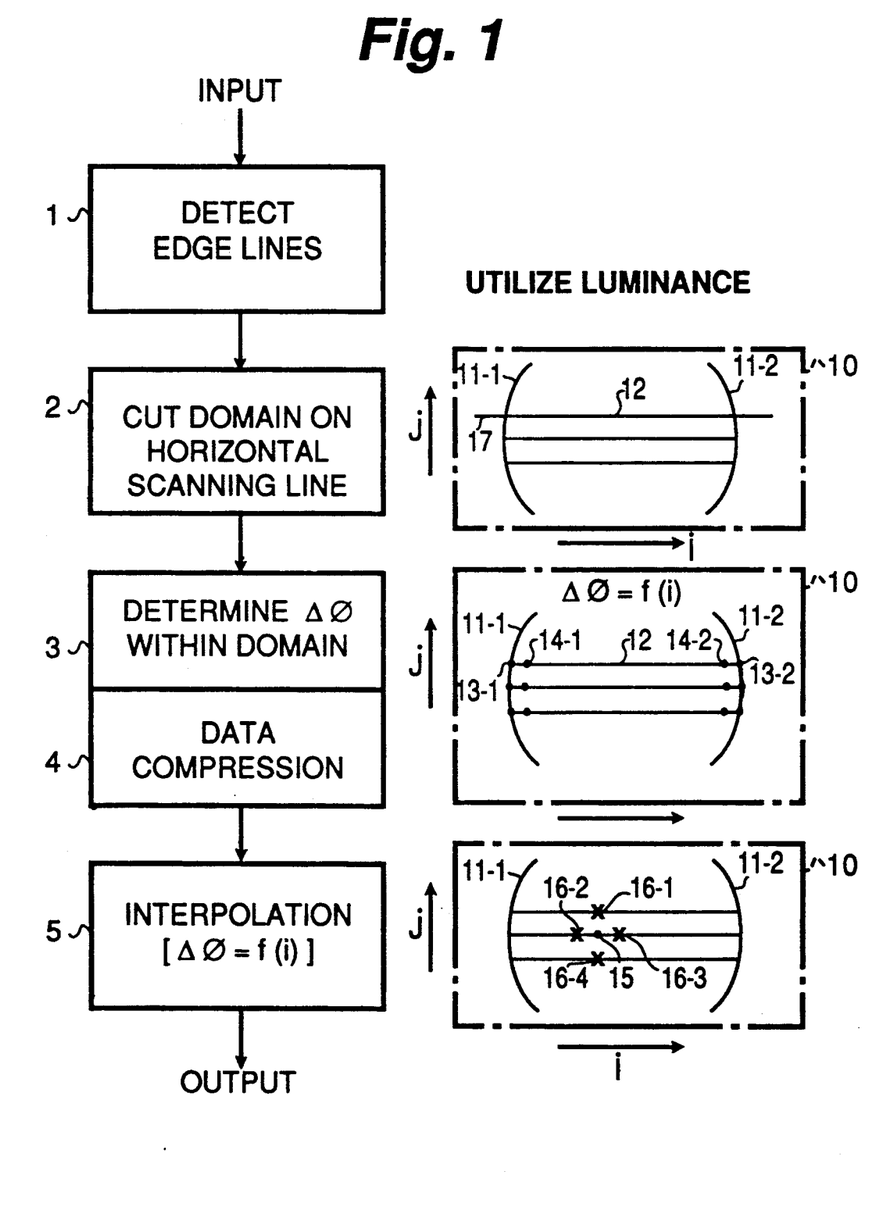
FIG. 1 is a flowchart showing the principle operation of the scalar data processing according to an embodiment of the present invention.

FIG. 1 is a flowchart showing the principle operation of the scalar data processing according to an embodiment of the present invention. The right hand side of the flowchart represents a picture on a display 10.

In the right-hand side figure in FIG. 1, reference 10 represents a display in which "i" represents an x coordinate in the horizontal direction and "j" represents a y coordinate in the longitudinal direction, 11-1 and 11-2 represent the edge lines, 12 represents a domain cut by the edge lines 11-1 and 11-2, 13-1 and 13-2 represent point on the edge lines 11-1 and 11-2 and on the horizontal scanning line 17, 14-1 and 14-2 represent points on the horizontal scanning line 17 adjacent to the points 13-1 and 13-2 on the edge lines 11-1 and 11-2, 15 represents a point within the cut domain 12 which is the subject for the interpolation, 16-1, 16-2, 16-3, and 16-4 represent points adjacent to the point 15, and 17 represents a horizontal scanning line.

In the figure, reference 1 is a step for detecting boundaries 11-1 and 11-2 (referred to as edge lines) of two-dimensional scalar data such as luminance of a picture image when the picture image is the subject to be processed. The edge line detecting step 1 is carried out by utilizing appropriate means as disclosed in U.S. Pat. No. 4,908,698 corresponding to Japanese Patent Application No. 63-39284, and therefore a practical explanation thereof is omitted here.

Reference 2 is a step for cutting the domain on a horizontal line 17 between the edge lines 11-1 and 11-2 detected by the edge line detecting step 1.

Reference 3 is a step for determining a Laplacian $\Delta\phi$ corresponding to the scalar data $\phi$ within the domain cut as above by approximating the Laplacian $\Delta\phi$ to be a function f(i) with respect to the coordinate on the horizontal scanning line. Namely, the Laplacian $\Delta\phi$ is approximated as a function f(i) which may be a constant value including zero, a linear function of the coordinate i, a quardaratic function of the coordinate i, or a three-dimensional function of the coordinate i, in accordance with the desired precision. In the Laplacian determining step 3, cooefficients in the function are determined by, for example, the method of least squares.

Reference 4 is a step for compressing data by extracting the values $\phi(i,j)$ on the edge lines 11-1 and 11-2 values $\phi(i,j)$ at points adjacent to the points on the edge lines 11-1 and 11-2 for providing values of grad $\phi(i,j)$ on the edge lines, and the above-mentioned function f(i) as the Laplacian $\Delta\phi$ within the cut domain 12.

Reference 5 is a step of interpolation to obtain the values $\phi(i,j)$ of the respective points on the horizontal scanning line 17 and within the cut domain 12 to reconstruct the original two-dimensional scalar data $\phi$.

In the domain cutting step 2, the edge lines 11-1 and 11-2 are shown on the display 10. A domain 12 on the horizontal scanning line 17 is cut by the edge line 11-1 and 11-2.

In the $\Delta\phi$ determining step 3, a Laplacian $\Delta\phi$ is calculated at each point on each horizontal scanning line by the use of the values of the scalar data $\phi$ on the edge lines 11-1 and 11-2 and its gradient on the conture lines 11-1 and 11-2 and by the use of the scalar data $\phi$ in the cut domain 12. Within the cut domain 12, the change of the Laplacian $\Delta\phi$ is considered to be loose. Therefore, the Laplacian $\Delta\phi$ can be approximated as a simple function f(i). Since there are four boundary values, i.e., the two scalar data on the edge lines and the two values of gradients on the edge lines, the function f(i) can be expressed by, at a maximum, a three-dimensional function with respect to the coordinate value i on the horizontal scanning line.

Accordingly, as the above function f(i), the following function may be applied.

$$\Delta\phi = f(i) = const \qquad \text{(i)}$$

$$\Delta\phi = f(i) = ai + b \qquad \text{(ii)}$$

$$\Delta\phi = f(i) = ai^2 + bi + c \qquad \text{(iii)}$$

$$\Delta\phi = f(i) = ai^3 + bi^2 + ci + d \qquad \text{(iv)}$$

The constant value in the equation (i), the coefficients a and b in the equation (ii), the coefficients a, b and c in the equation (iii), or the coefficients a, b, c and d are determined in such a way that the function f(i) is as close as possible to the calculated Laplacian $\Delta\phi$ at each point by, for example, means of the method of least squares. According to an experiment performed by the inventors, even when an approximately is taken so that $$f(i) = 0$$

the reconstructed two-dimensional scalar data is sufficient to be used in practice.

When a higher degree of approximately is required, an approximation of higher accuracy is carried out by the use of the equation (i), (ii), (iii) or (iv).

In the data compression step 4, for each horizontal scanning line 17, the values $\phi(i,j)$ at the points 13-1 and 13-2 on the edge lines 11-1 and 11-2, the values $\phi(i,j)$ at the points 14-1 and 14-2 adjacent to the points 13-1 and 13-2 for calculating the gradient on the edge lines 11-1 and 11-2, and the above-mentioned function f(i) are used as compressed data. The compressed data is transmitted to a receiving side or is stored for reconstruction. Of course, the adjacent points 14-1 and 14-2 for obtaining the gradients on the edge lines are not restricted to two, but adjacent points on the edge lines 11-1 and 11-2 may also be taken into account. The values $\phi(i,j)$ and the gradients on the edge lines, however, do not greatly change overall. Therefore, it is sufficient to take into account only the above-mentioned two points 14-1 and 14-2 to obtain the gradient on the edge lines.

In the interpolation step 5, the value $\phi(i,j)$ at each point within the cut domain 12 on the horizontal scanning line 17 is obtained by interpolation to reconstruct the original two-dimensional scalar data. Namely, to obtain the value $\phi(i,j)$ at each point 15 within the domain 12, interpolation is carried out in accordance with a successive approximation by the use of the compressed data, i.e. the boundary values $\phi(i,j)$ on the edge lines 11-1 and 11-2, the boundary values grad $\phi(i,j)$ on the edge lines 11-1 and 11-2, and the above-mentioned function f(i).

According to the successive approximation used to obtain the value $\phi(i,j)$ at a point 15 within the cut domain 12, roughly determined values $\phi(i,j)$ at points 16-1, 16-2, 16-3, and 16-4 adjacent to the point 15 and a roughly determined value $\phi(i,j)$ at the point 15 are utilized to calculate a rough Laplacian $\Delta\phi(i,j)$. The interpolation process is carried out in such a way that the above-mentioned function f(i) is satisfied as long as possible.

Figure 2A:
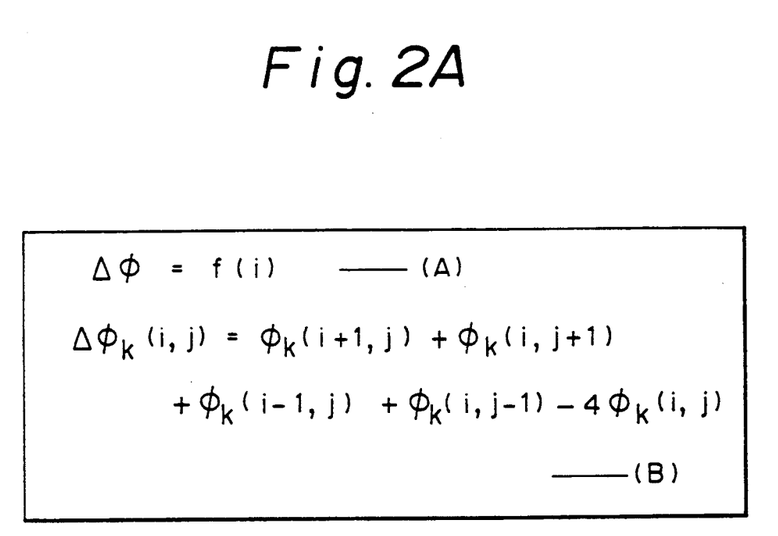
FIG. 2A shows equations used for effecting interpolation according to an embodiment of the present invention.
Figure 2B:
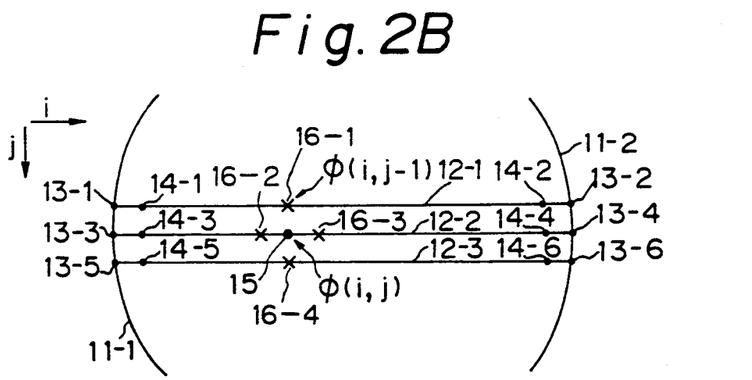
FIG. 2B shows a display surface for explaining the interpolation process according to an embodiment of the present invention.

FIG. 2A shows equations for carrying out the interpolation process according to an embodiment of the present invention, and FIG. 2B shows a display for explaining the interpolation process.

As shown in FIG. 2A, the equation (A), i.e., $\Delta\phi = f(i)$, and the equation (B), i.e., $\Delta\phi_k = \phi_k(i+1,j) + \phi_k(i,j+1) + \phi_k(i-1,j) + \phi_k(i,j-1) - 4\phi_k(i,j)$, where the suffix k represents the number of times of estimation, are utilized for interpolation.

Generally, the Laplacian $\Delta\phi$ can be expressed by the equation (B) shown in FIG. 2A. This equation can be understood from the following calculations:

$$\partial\phi/\partial x = \phi(i+1,j) - \phi(i,j)$$

$$\partial\phi/\partial x = \phi(i,j+1) - \phi(i,j)$$

$$\partial^2\phi/\partial x^2 = \phi(i+1,j) - \phi(i,j) - \phi(i,j) + \phi(i-1,j) = \phi(i+1,j) - 2\phi(i,j) + \phi(i-1,j)$$

Similarly, $$\partial^2\phi/\partial y^2 = \phi(i,j+1) - 2\phi(i,j) + \phi(i,j-1)$$

Accordingly, $$\Delta\phi = \partial^2\phi/\partial x^2 = \partial^2\phi/\partial y^2 = \phi(i+1,j) - 2\phi(i,j) +$$
$$\phi(i-1,j) + \phi(i,j+1) - 2\phi(i,j) + \phi(i,j-1) =$$
$$\phi(i+1,j) + \phi(i,j+1) + \phi(i-1,j) + \phi(i,j-1) - 4\phi(i,j)$$

First, based on the compressed data, the values $\phi(i,j)$ at the points 13-1 to 13-6 on the edge lines 11-1 and 11-2 are known. Also, the values $\phi(i,j)$ at the points 14-1 to 14-6 adjacent to the points 13-1 to 13-6 are known because the gradient $\phi(i,j)$ on the edge lines are included in the compressed data. Based on these values $\phi(i,j)$ at the points 13-1 to 13-6 and the values $\phi(i,j)$ at the points 14-1 to 14-6, the value at each point within the cut domain 12 is roughly estimated. For example, the first estimation is carried out in such a way that the values of the points between the points 14-1 and 14-2 are assumed to be linearly changed. By this estimation, it is assumed that the estimated value at each point within the cut domains 12-1 to 12-3 is expressed as $\phi_1(i,j)$. Then, the estimated Laplacian $\Delta\phi_1(i,j)$ is calculated in accordance with the equation (B), where k=1.

Next, the estimated Laplacian $\Delta\phi_1(i,j)$ and the function f(i) are compared to determine whether the estimated value $\Delta\phi_1(i,j)$ satisfies the function f(i). To this end, an error $E_1$ is calculated, where $$E_1 = f(i) - \Delta\phi_1(i,j) \tag{5}$$

When the absolute value of the error $E_1$ is larger than a predetermined threshold value, the first estimated values $\phi_1(i,j)$ at each point are corrected to secondary estimated values $\phi_2(i,j)$ in the following manner.

$$\begin{aligned}
\phi_1(i+1,j) &\rightarrow \phi_2(i+1,j) + \alpha E_1 \\
\phi_1(i-1,j) &\rightarrow \phi_1(i-1,j) + \alpha E_1 \\
\phi_1(i,j+1) &\rightarrow \phi(i,j+1) + \alpha E_1 \\
\phi_1(i,j-1) &\rightarrow \phi_2(i,j-1) + \alpha E_1 \\
\phi_1(i,j) &\rightarrow \phi_2(i,j) - 4\alpha E_1
\end{aligned} \tag{6}$$

(where $0 < \alpha < 1$)

By using the secondary estimated values, a similar calculation is made according to the equation (B), i.e., $\Delta\phi_2(i,j) = \phi_2(i+1,j) + \phi_2(i,j+1) + \phi_2(i-1,j) + \phi_2(i,j-1) - 4\phi_2(i,j)$. Then, if an error $E_2 = f(i) - \Delta\phi_2(i,j)$ is larger than the predetermined threshold value, the secondary estimated values $\phi_2(i,j)$ at each point are corrected to third estimated values in a way similar to the above. Namely, by using the above relation, the correction is made and the value $\phi(i,j)$ at each point within the cut domain is converged so that the above-mentioned function f(i) is satisfied within the predetermined threshold value. As a result, the value $\phi(i,j)$ at each point on the two-dimensional surface can be reconstructed.

Figure 3A:
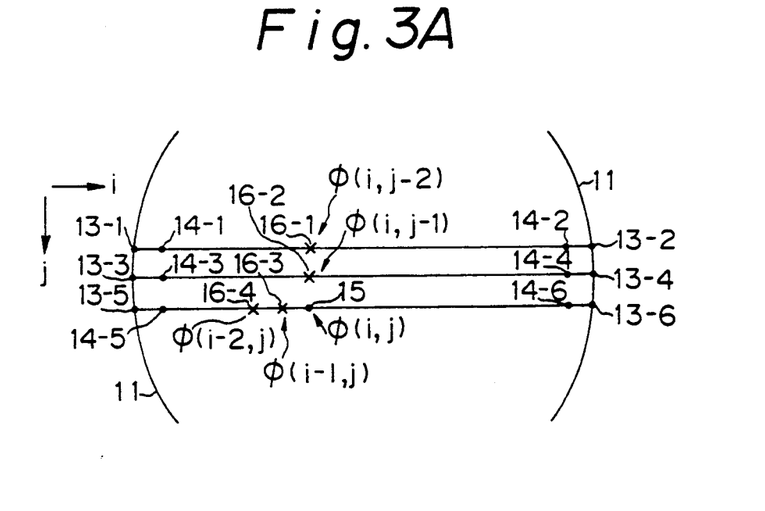
FIG. 3A shows a display surface for explaining the interpolation process according to another embodiment of the present invention.

FIG. 3A shows a display for explaining the interpolation process according to another embodiment of the present invention. In the illustrated case, the Laplacian $\Delta\phi$ can also be expressed by the equation (D) shown in FIG. 3B. This equation can be understood by the following calculations:

$$\partial\phi/\partial x = \phi(i,j) - \phi(i-1,j)$$

$$\partial\phi/\partial x = \phi(i,j) - \phi(i,j-1)$$

$$\partial^2\phi/\partial x^2 = \phi(i,j) - \phi(i-1,j) - \phi(i-1,j) + \phi(i-2,j) = \phi(i,j) - 2\phi(i-1,j) + \phi(i-2,j)$$

Similarly, $$\partial^2\phi/\partial y^2 = \phi(i,j) - 2\phi(i,j-1) + \phi(i,j-2)$$

Accordingly, $$\Delta\phi = \partial^2\phi/\partial x^2 + \partial^2\phi/\partial y^2 = 2\phi(i,j) - 2\phi(i-1,j) + \phi(i-2,j) - 2\phi(i,j-1) + \phi(i,j-2)$$

First, based on the compressed data, the values $\phi(i,j)$ at the points 13-1 to 13-6 on the edge lines 11-1 and 11-2 are known. Also, the values $\phi(i,j)$ at the points 14-1 to 14-6 adjacent to the points 13-1 to 13-6 are known as explained before. Based on these value $\phi(i,j)$ at the points 13-1 to 13-6 and the values $\phi(i,j)$ at the points 14-1 to 14-6, the value at each point within the cut domain is roughly estimated in the same way as described with reference to FIG. 2B. By this estimation, it is assumed that the estimated value at each point within the cut domains 12-1 to 12-3 is expressed as $\phi_1(i,j)$. Then, the estimated Laplacian $\Delta\phi_1(i,j)$ is calculated in accordance with the equation (D).

Next, the estimated Laplacian $\Delta\phi_1(i,j)$ and the function f(i) are compared to determine whether the estimated value $\Delta\phi_1(i,j)$ satisfies the function f(i). To this end, an error $E_1$ is calculated, where $$E_1 = f(i) - \Delta_1(i,j) \tag{7}$$

When the absolute value of the error E is larger than a predetermined threshold value, the first estimated value $\phi_1(i,j)$ at each point is corrected to a secondary estimated value $\phi_2(i,j)$ in the following manner:

$$\begin{aligned}
\phi_1(i-1,j) &\rightarrow \phi_2(i,j) + \alpha E_1 \\
\phi_1(i-1,j) &\rightarrow \phi_2(i-1,j) + \alpha E_1 \\
\phi_1(i,j-1) &\rightarrow \phi_2(i,j-1) + \alpha E_1 \\
\phi_1(i-2,j) &\rightarrow \phi_2(i-2,j) + \alpha E_1 \\
\phi_1(i,j-2) &\rightarrow \phi_2(i,j-2) - 4\alpha E_1
\end{aligned} \tag{8}$$

(where $0 < \alpha < 1$)

Figure 3B:
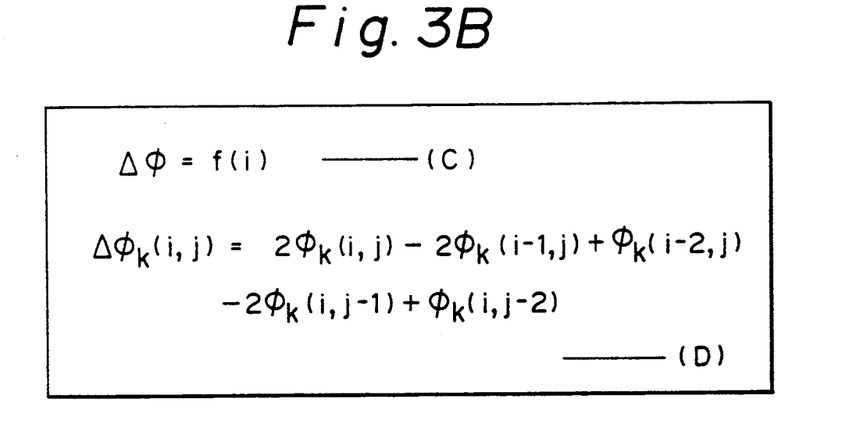
FIG. 3B shows equations used for effecting interpolation in the embodiment shown in FIG. 3A.

By using the secondary estimated values, a similar calculation is carried out according to the equation (D), i.e., $\Delta\phi_2(i,j) = 2\phi_2(i,j) - 2\phi_2(i-1,j) + \phi_2(i-1,j) - 2\phi_2(i,j-1) + \phi_2(i,j-2)$. Then, if an error $E_2 = f(i) - \Delta\phi_2(i,j)$ is greater than the predetermined threshold value, the secondary estimated value $\phi_2(i,j)$ at each point is corrected to a third estimated value in the similar way as above. Namely, by using the above relation, the correction is made and the value $\phi(i,j)$ at each point within the cut domain is converged so that the above-mentioned function f(i) is satisfied within the predetermined threshold value.

Figure 4:
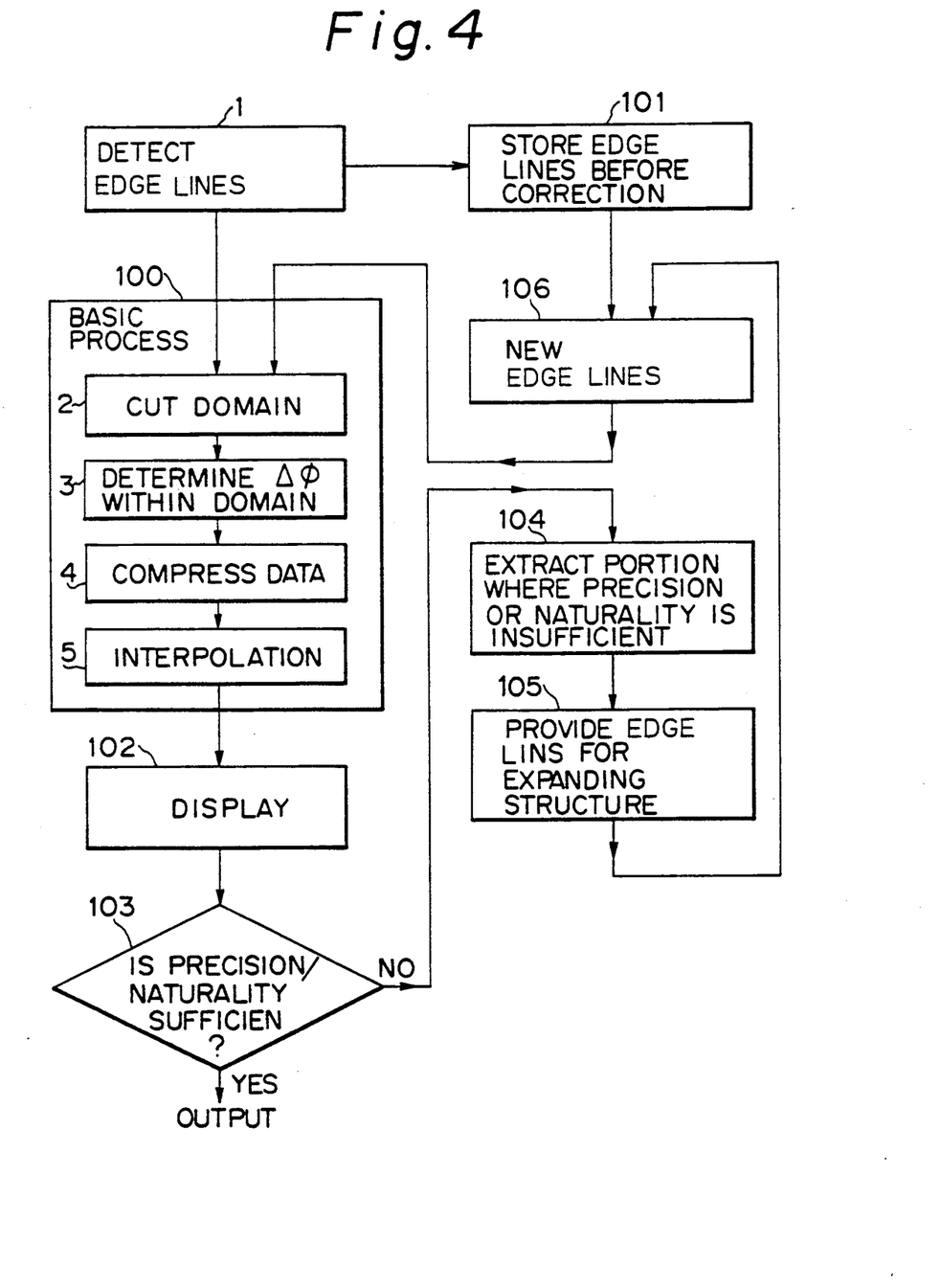
FIG. 4 is a flowchart for explaining the total operation from the detection of the edge lines of the two-dimensional scalar data to the output of the two-dimensional scalar data, including the steps 2 to 4 in FIG. 1, according to an embodiment of the present invention.

FIG. 4 is a flowchart for explaining the total operation from the detection of the edge lines of the two-dimensional scalar data to the output of the two-dimensional scalar data, including the steps 2 to 4 in FIG. 1, according to an embodiment of the present invention.

In the figure, reference 100 represents a basic process including the steps 2 to 4 shown in FIG. 1, 1 represents a edge line detecting step, 101 represents a storing step for storing edge line data before correction, 102 represents a total display process, 103 represents a precision or naturality judging process, 104 represents a step for extracting portions where the precision or naturality is insufficient, 105 represents a step for providing edge lines for expanding the structure of the two-dimensional scalar data, and 106 represents a step for forming data of new edge lines.

Before carrying out the basic process 100, the edge lines are detected by the edge line detecting step 1 illustrated in FIG. 1, and the detected edge lines are stored in a memory (not shown) in the step 101.

In the basic process 100, the data of the detected edge lines are processed in the steps 2 to 4 according to the method described before so that the two-dimensional scalar data similar to the original two-dimensional scalar data is reconstructed. The reconstructed two-dimensional scalar data is displayed on, for example a display surface in the total display process 102.

In the precision or naturality judging process 103, in view of the illustrated picture image of the two-dimensional scalar data, an operator, for example, checks to determine whether there is an insufficiency in the precision or in the naturality. The precision is judged when the compressed data of the two-dimensional scalar data is to be transmitted. The naturality is judged when the two-dimensional scalar data is given by, for example, a car designer, and when compressed data of the two-dimensional scalar data is to be stored. If there is an insufficiency, that portion in extracted in the step 104 for extracting a portion where the precision or the naturality is insufficient. This portion is, for example, a portion where the change of the luminance is comparatively loose so that no edge line is found, causing the above-mentioned insufficiency.

In the step 105 for providing edge lines for expanding the structure, data of a new edge line corresponding to the above-mentioned insufficient portion is provided. Then, in step 106, the data of the new edge line is combined with the data of the edge lines before correction stored in the step 101 so that data of a new edge line is obtained. The data of the new edge line is introduced to the basic process 100 so that the two-dimensional scalar data is again reconstructed.

These new edge lines play a role to correct values of $\phi(i,j)$ to satisfy the designer. In this case, these new edge lines provides correction lines which are virtual lines.

The above-mentioned steps 100 to 106 are repeated until data having sufficient precision or sufficient naturality is obtained. If the reconstructed data is sufficient, it is output.

Figure 5:
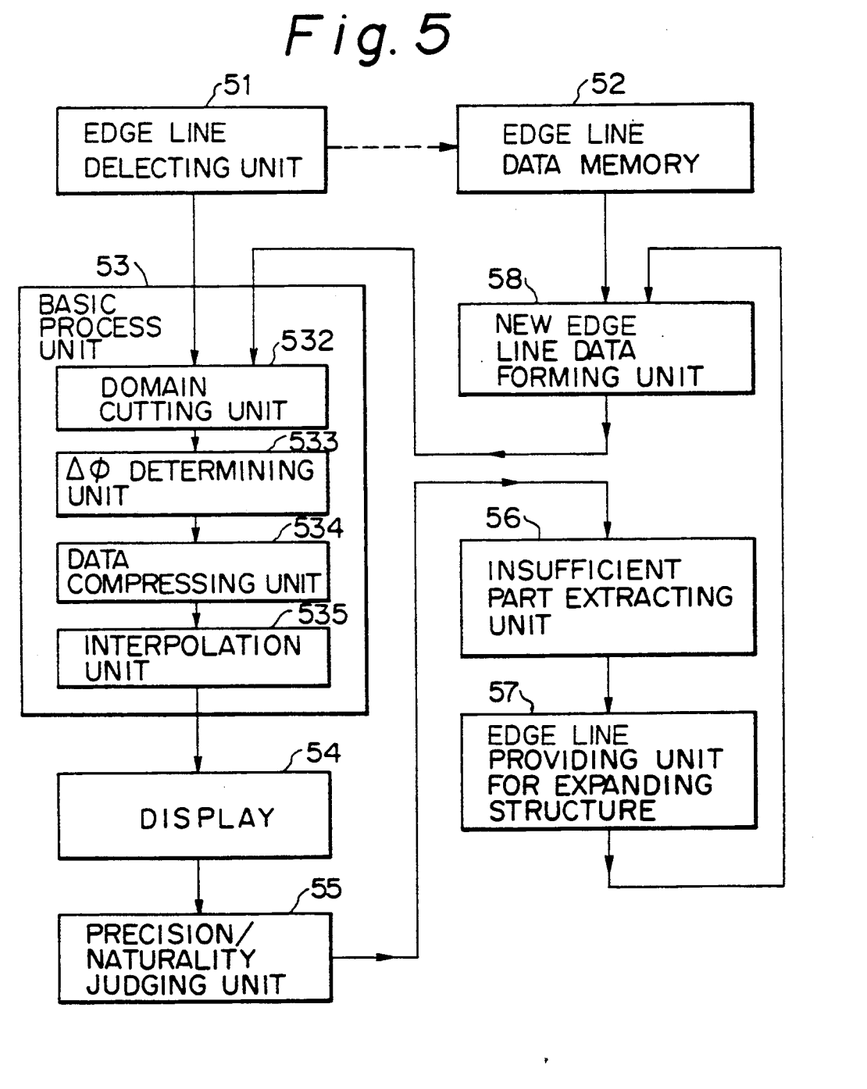
FIG. 5 is a block diagram showing a scalar data processing apparatus according to an embodiment of the present invention.

FIG. 5 is a block diagram showing a scalar data processing apparatus according to an embodiment of the present invention. In the figure, 51 represents an edge line detecting unit, 52 represents an edge line data storing memory for storing edge line data before correction, and 53 represents a basic process unit including a domain cutting unit 532, a $\Delta\phi$ determining unit 533, a data compressing unit 534, and an interpolation unit 535. Reference 54 is a display for effecting a total display process, 55 represents a precision or naturality judging unit, 56 represents a unit for extracting portions where the precision or naturality is insufficient, 57 represents a unit for providing edge lines for expanding the structure of the two-dimensional scalar data, and 58 represents a unit for forming data of new edge lines.

The operation of the scalar data processing apparatus shown in FIG. 5 is already described with reference to FIG. 4.

In the present invention, the following windows are provided so that display is carried out by a multi-window system in accordance with necessity. Namely, there are provided:

(i) an edge line display window
(ii) an edge line circumferential data display window
(iii) a data display window
(iv) a texture definition/superimposition display window
(v) a new edge line display window
(vi) a process history display window and
(vii) a moving picture/animation display window.

The above windows (i), (ii), and (iii) are used to extract the values $\phi(i,j)$ and their gradients on the edge lines. The window (iv) is used to compensate the parts where the above-mentioned compression and interpolation process are insufficient to obtain the desired reconstructed scalar data. The window (v) is used in the step 106 shown in FIG. 4. The windows (vi) and (vii) are used in steps 100 to 106 are necessary.

Also, as window operating functions, the following functions are provided. Namely, there are provided:

(i) edge line definition/correction function
(ii) data definition/correction function
(iii) definition of interpolation data output display-structure expansion edge line/correction function
(iv) texture definition/scorrection function
(v) definition of continuousness of a moving picture/-correction function and
(vi) texture definition in a domain/correction function.

From the foregoing description, it is apparent that, according to the present invention, the data value $\phi(i,j)$ of two-dimensional scalar data at each point can be reconstructed in such a way that $$E = f(i) - \Delta\phi(i,j)$$

becomes within a threshold value. Namely, by transmitting the function f(i) and, for example, the data values $\phi(i,j)$ of at least four points on the edge lines and adjacent to the edge lines, the original two-dimensional scalar data can be reconstructed.

The present invention can be applied not only when the two-dimensional scalar data is to be transmitted but also when the two-dimensional scalar data is to be stored by, for example, a car designer.

We claim:

1. A scalar data processing method for compressing two-dimensional scalar data defined on a two-dimensional surface having a horizontal direction and a vertical direction and for reconstructing said two-dimensional scalar data based on said compressed data, comprising the steps of:

(a) detecting edge lines of said two-dimensional scalar data, said edge lines being detected when a change in value of said two-dimensional scalar data between adjacent points on said two-dimensional surface is larger than a predetermined threshold value;
   (b) cutting a domain on a horizontal line intersecting said edge lines and between said edge lines;
   (c) determining a function as an approximation of a Laplacian of said two-dimensional scalar data at each point in said domain;
   (d) compressing said two-dimensional scalar data by replacing aid two-dimensional scalar data at every point with scalar data at said edge lines, scalar data for providing gradients of said two-dimensional scalar data on said edge lines, and said function, to produce replaced data; and
   (e) reconstructing said two-dimensional scalar data by interpolating said two-dimensional scalar data based on said scalar data at said edge lines, scalar data for providing gradients of said two-dimensional scalar data on said edge lines, and said function obtained in said compressing step.

2. A scalar data processing method as claimed in claim 1, wherein said detecting edge lines in step (a) comprises a step (a) for detecting data of said edge lines.

3. A scalar data processing method as claimed in claim 2, wherein said cutting in step (b) comprises a step for cutting said domain based on said data of said edge lines.

4. A scalar data processing method as claimed in claim 1, wherein said step (c) for determining the function, the function is zero.

5. A scalar data processing method as claimed in claim 1, wherein said step (c) for determining the function, the function is a constant value.

6. A scalar data processing method as claimed in claim 1, wherein said step (c) for determining the function, the function is a linear function with respect to a coordinate of the horizontal line.

7. A scalar data processing method as claimed in claim 1, wherein said step (c) for determining the function, the function is a secondary order function with respect to a coordinate of the horizontal line.

8. A scalar data processing method as claimed in claim 1, wherein said step (c) for determining the function, the function is a third order function with respect to a coordinate of the horizontal line.

9. A scalar data processing method as claimed in claim 1, wherein said step (c) for determining the function, the function is determined by the method of least-square approximation with respect to the function and the Laplacian of said two-dimensional scalar data at each point on said two-dimensional surface.

10. A scalar data processing method as claimed in claim 1, wherein in said step (d) for compressing said two-dimensional scalar data, said replaced data is transmitted from a transmitting side to a receiving side when said two-dimensional scalar data is to be transmitted.

11. A scalar data processing method as claimed in claim 1, wherein in said step (d) for compressing said two-dimensional scalar data, said replaced data is transmitted from a transmitting side to a receiving side, and wherein in said step (e) the interpolation is carried out in said receiving said.

12. A scalar data processing method as claimed in claim 1, wherein said step (d) for compressing said two-dimensional scalar data, said replaced data is stored for reconstructing the two-dimensional scalar data in its original form by said interpolation step.

13. A scalar data processing method as claimed in claim 1, wherein said step (e) for reconstructing said two-dimensional scalar data, said interpolation is carried out by successive approximation which includes a first approximation in which the approximated two-dimensional data is determined based on said edge lines and the gradients of the two-dimensional scalar data, and then a difference between said function and a value of a Laplacian of approximated two-dimensional scalar data at each point falls within a predetermined threshold value.

14. A scalar data processing method as claimed in claim 13, wherein in said step (e) for reconstructing said two-dimensional scalar data, said value of the Laplacian of approximated two-dimensional scalar data at each point is expressed as $\Delta\phi k(i,j)=\phi k(i+1,j)+\phi k(i,j+1)+\phi k(i-1,j)+\phi k(i,j-1)-4\phi k(i,j)$, where i is an x coordinate, j is a y coordinate, and k is a number of successive approximations.

15. A scalar data processing method as claimed in claim 13, wherein said step (e) for reconstructing said two-dimensional scalar data, said value of the Laplacian of approximated two-dimensional scalar data at each point is expressed as $\Delta\phi k(i,j)=2\phi k(i,j)-2\phi k(i-1,j)+\phi k(i-2,j)-2\phi k(i,j-1)+\phi k(i,j-2)$, where i is an x coordinate, j is a y coordinate, and k is a number of successive approximations.

16. A scalar data processing apparatus for compressing two-dimensional scalar data defined on a two-dimensional surface having a horizontal direction and a vertical direction and for reconstructing said two-dimensional scalar data based on said compressed data, comprising:

edge line detecting means for detecting edge lines of said two-dimensional scalar data, said edge lines being detected when the change value of said two-dimensional scalar data between adjacent points on said two-dimensional surface is larger than a predetermined threshold value;

domain cutting means for cutting a domain on a horizontal line intersecting with said edge lines and between said edge lines;

function determining means for determining a function as an approximation of a Laplacian of said two-dimensional scalar data at each point in said domain;

compressing means for compressing said two-dimensional scalar data by replacing said two-dimensional scalar data at every point with scalar data at said edge lines, scalar data for providing gradients of said two-dimensional scalar data on said edge lines, and said function; and reconstructing means for reconstructing said two-dimensional scalar data by interpolating said two-dimensional scalar data based on said scalar data at said edge lines, scalar data for providing gradients of said two-dimensional scalar data on said edge lines, and said function.

* * * * *